A. B. CONN.
NUT LOCK.
APPLICATION FILED JUNE 30, 1908.
902,646.
Patented Nov. 3, 1908.
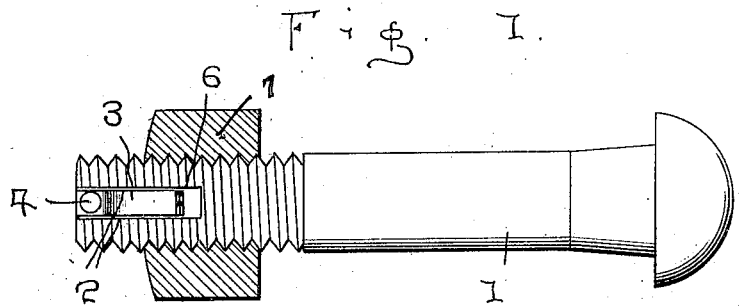
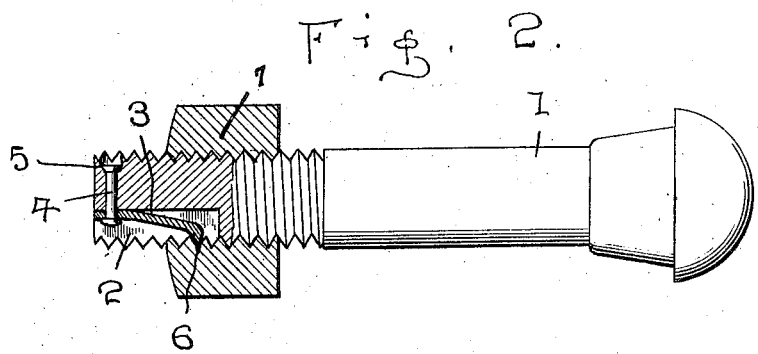
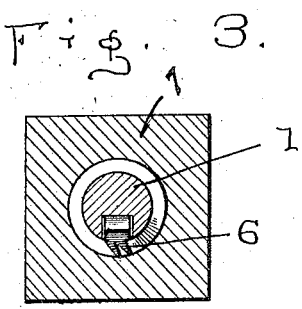
WITNESSES:
INVENTOR
A. B. Conn
BY
W. J. Fitzgerald
Attorneys

UNITED STATES PATENT OFFICE.

ARCHIE B. CONN, OF GANS, PENNSYLVANIA.

NUT-LOCK.

No. 902,646.

Specification of Letters Patent.

Patented Nov. 3, 1908.

Application filed June 30, 1908. Serial No. 441,102.

*To all whom it may concern:*

Be it known that I, ARCHIE B. CONN, a citizen of the United States, residing at Gans, in the county of Fayette and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks and it is an object of the invention to provide a novel device of this character wherein the nut or bur is frictionally engaged by an element carried by the bolt for holding the nut or bur against rotation on the bolt under normal conditions.

It is also an object of the invention to provide a novel device of this character which will be simple in construction, efficient and advantageous in practice and comparatively inexpensive to manufacture.

With the above and other objects in view the invention consists in the details of construction and in the novel arrangement and combination of parts to be hereinafter more particularly referred to.

In describing the invention in detail reference will be had to the accompanying drawings forming part of this specification wherein like characters of reference denote corresponding parts in the several views, and in which, Figure 1 is a view partly in section and partly in elevation of a bolt and nut illustrating the invention. Fig. 2 is a view similar to Fig. 1, the sectional line being at right angles to that in Fig. 1. Fig. 3 is a cross sectional view taken through the nut and bolt beneath the spring to illustrate the prongs of the spring in detail.

In the drawings 1 denotes a bolt which may be of any ordinary or preferred construction, in the present instance illustrated as a railroad bolt. The free end portion of the threaded shank is provided with a longitudinally arranged recess 2 having secured adjacent its outer end the end portion of a flat spring 3 which projects inwardly and upwardly of the recess. This spring 3 is held or anchored to the bolt 1 by a pin 4, which has its head 5 counter-sunk so that the head will not obstruct or interfere with the threads of the bolt. The free end portion of the spring 3 is formed into a plurality of prongs 6 which are inclined in a direction of the rotation of the nut 7 when being removed from the bolt. This spring owing to its resiliency will normally engage the bore of the nut and the frictional contact thereof will hold the same against retrograde rotation.

I claim:

In combination with a bolt having a recess in its free end portion and a nut in threaded engagement therewith; of a spring within the recess secured at one end to the bolt, the free end of said spring terminating in prongs extending in the direction of movement of the nut when being applied to the bolt.

In testimony whereof I have signed my name to this specification in the presence of two subscribing witnesses.

ARCHIE B. CONN.

Witnesses:
J. A. HERTZOG,
LUCY G. HERTZOG.